Oct. 3, 1967

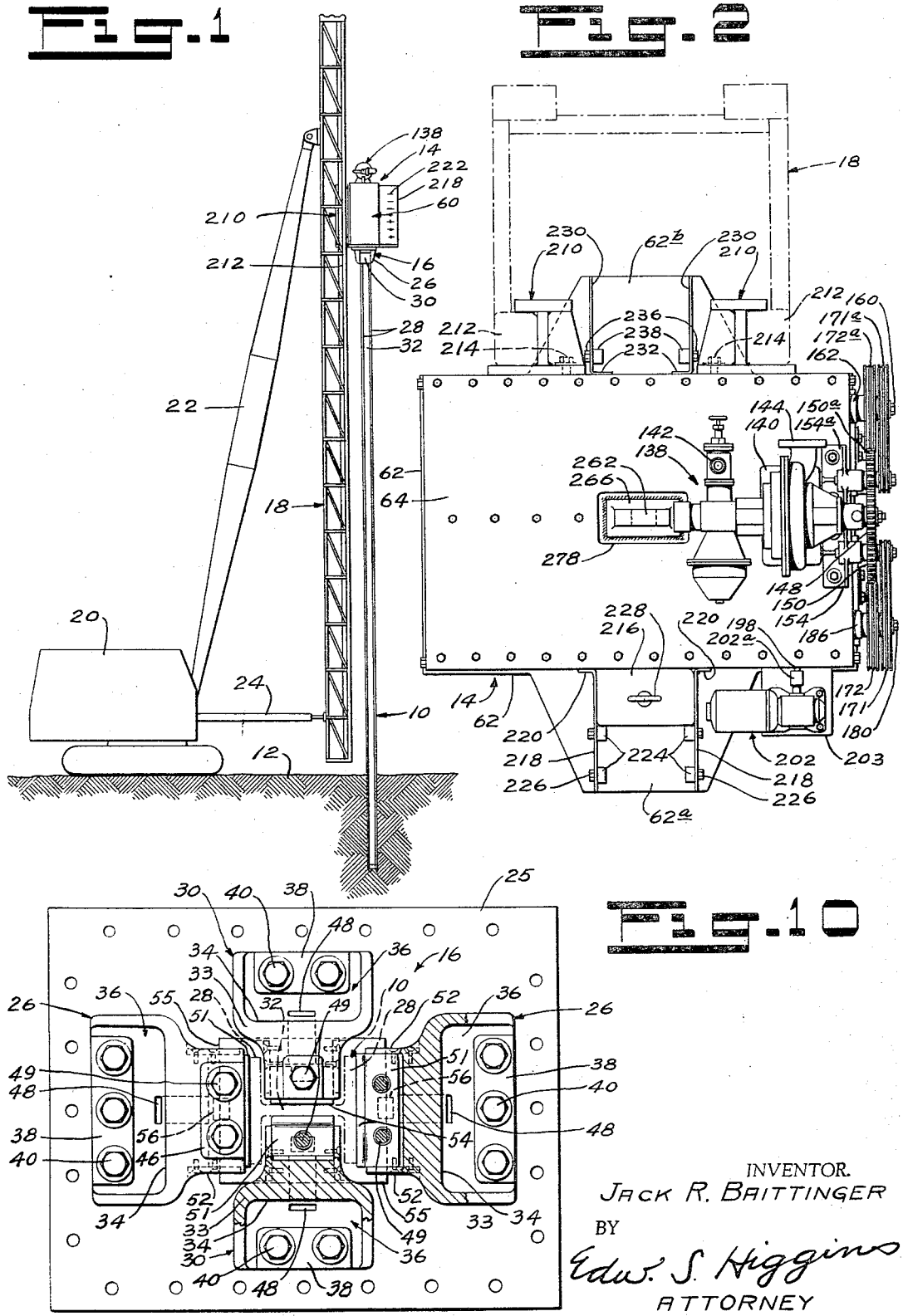

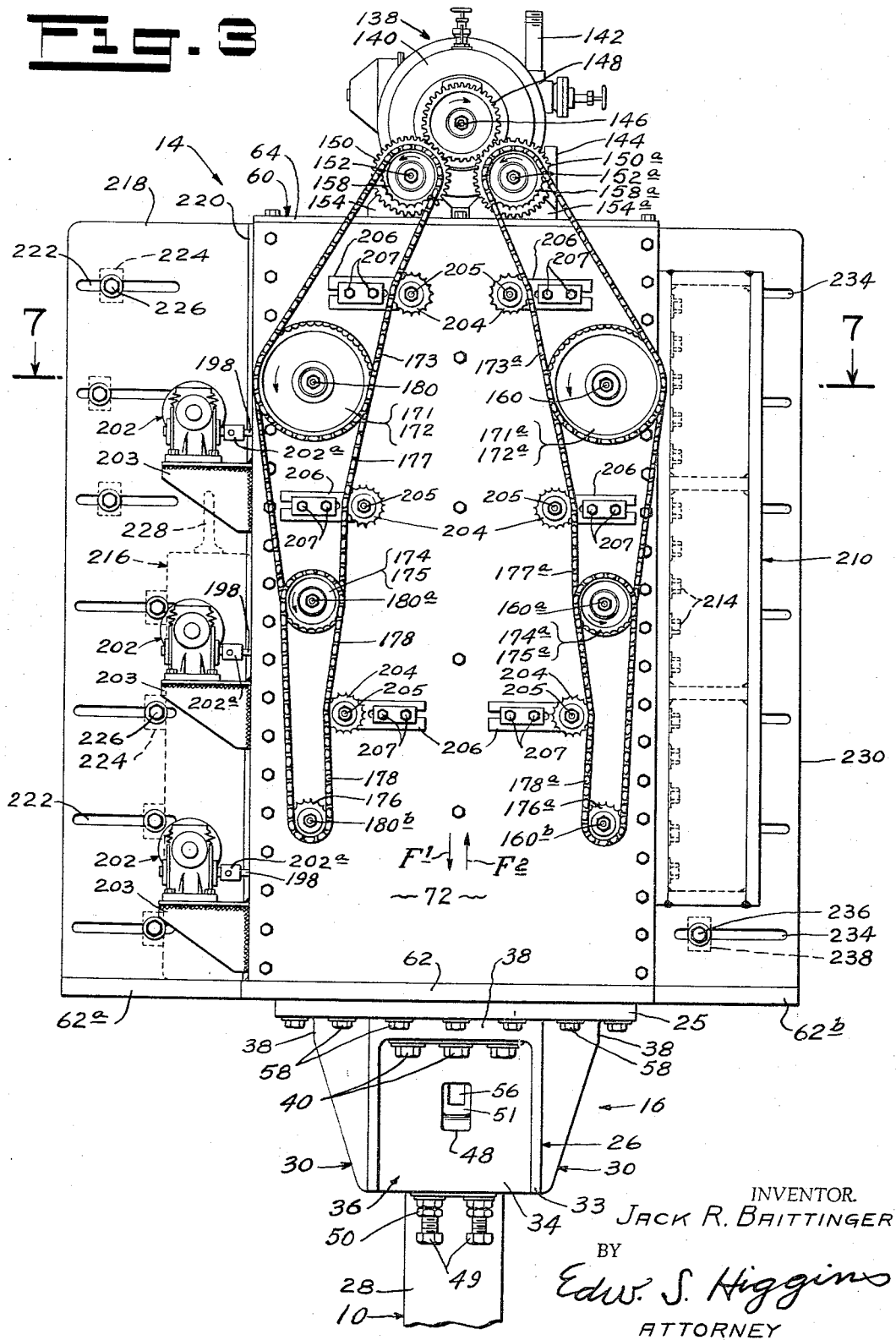

J. R. BAITTINGER 3,344,873

MECHANICAL HETERODYNE OSCILLATOR

Filed Sept. 17, 1964

INVENTOR.
JACK R. BAITTINGER
BY
Edw. S. Higgins
ATTORNEY

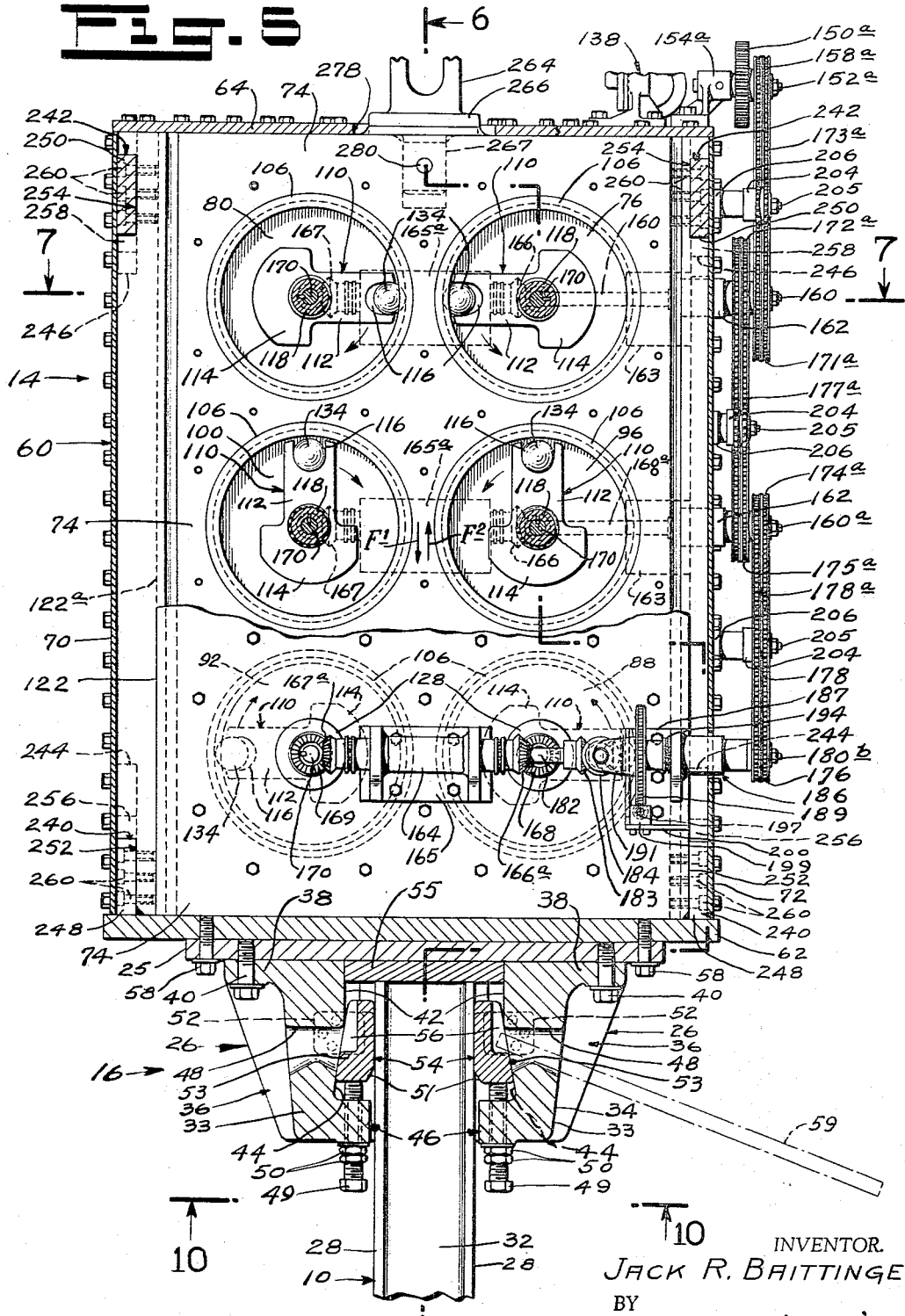

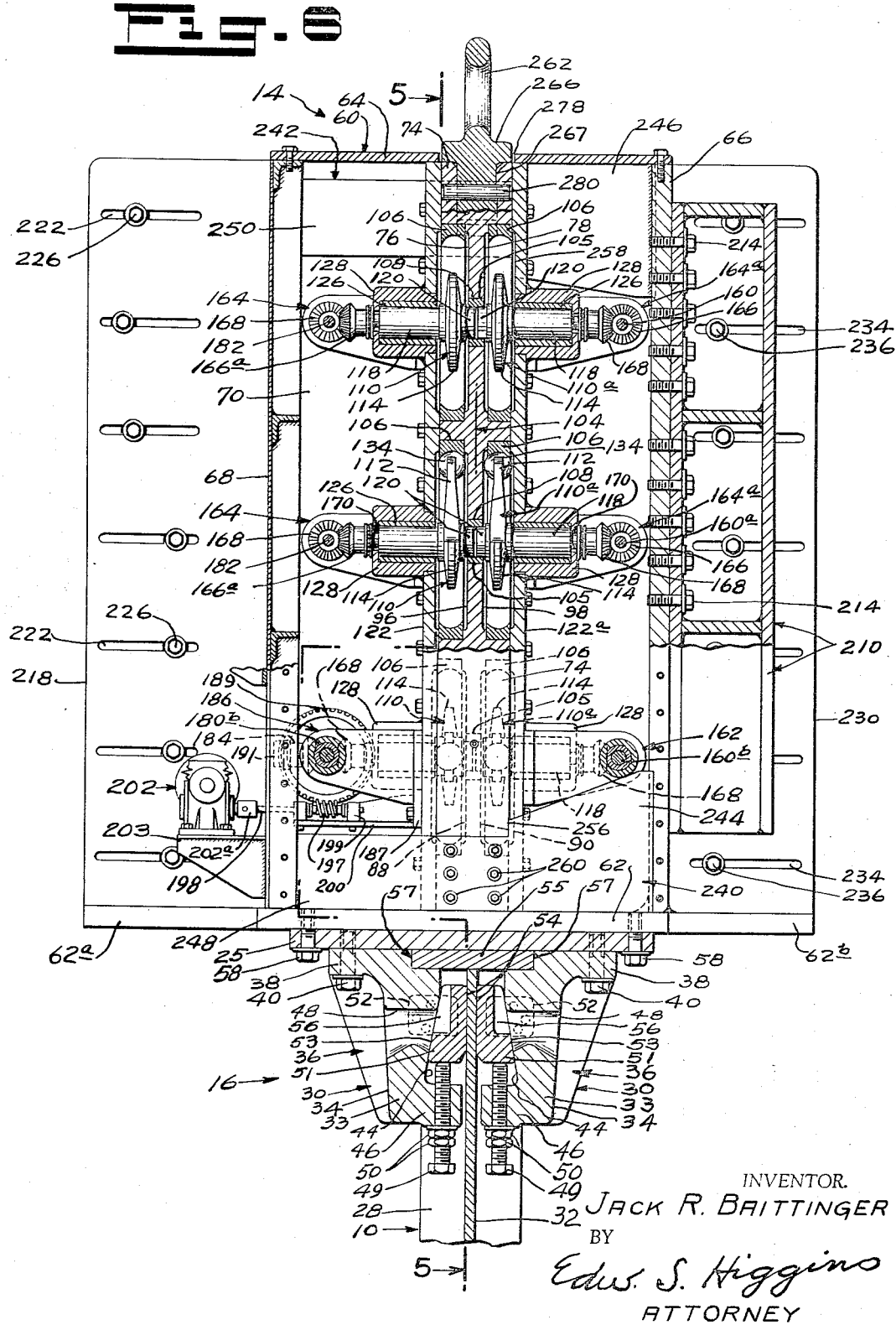

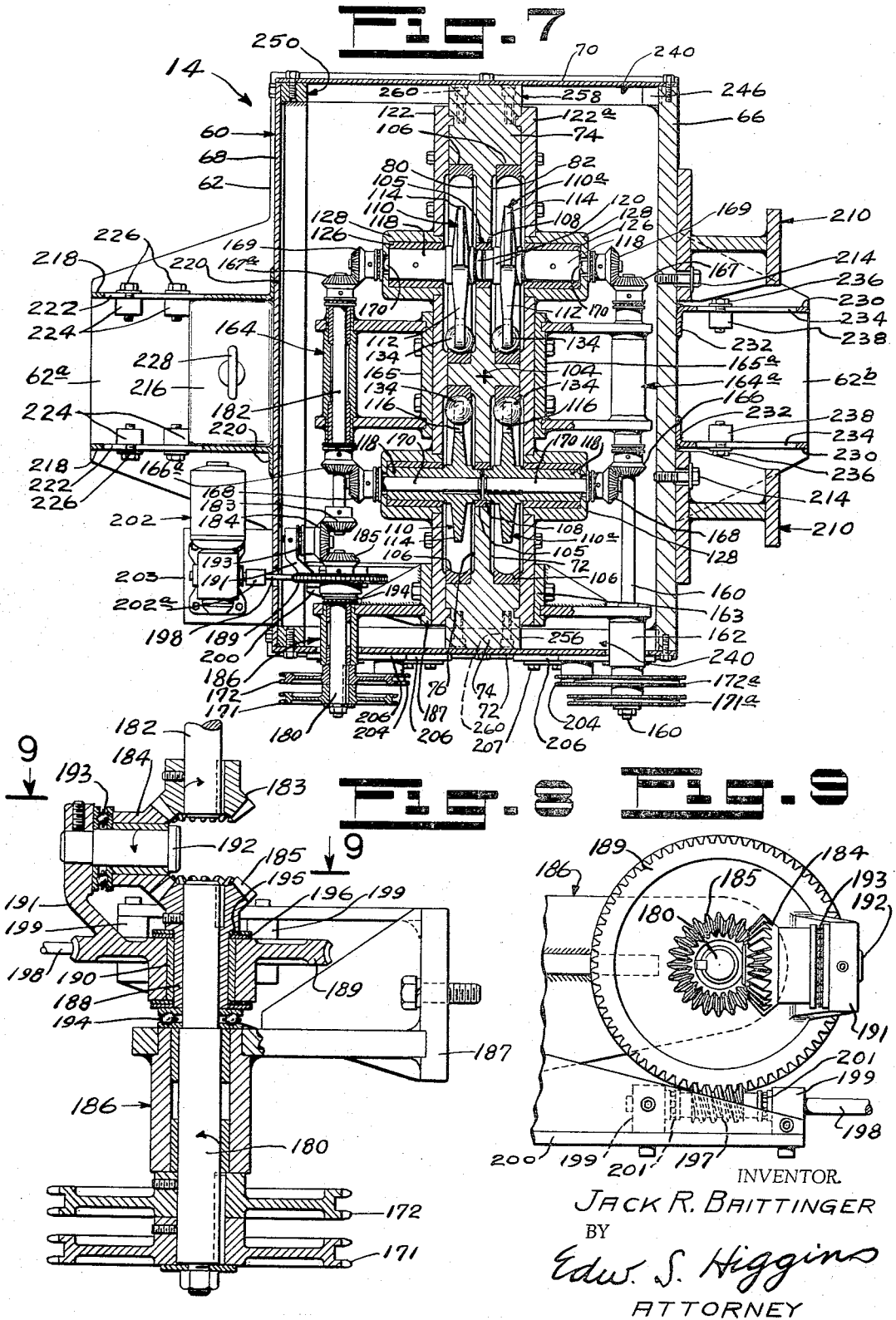

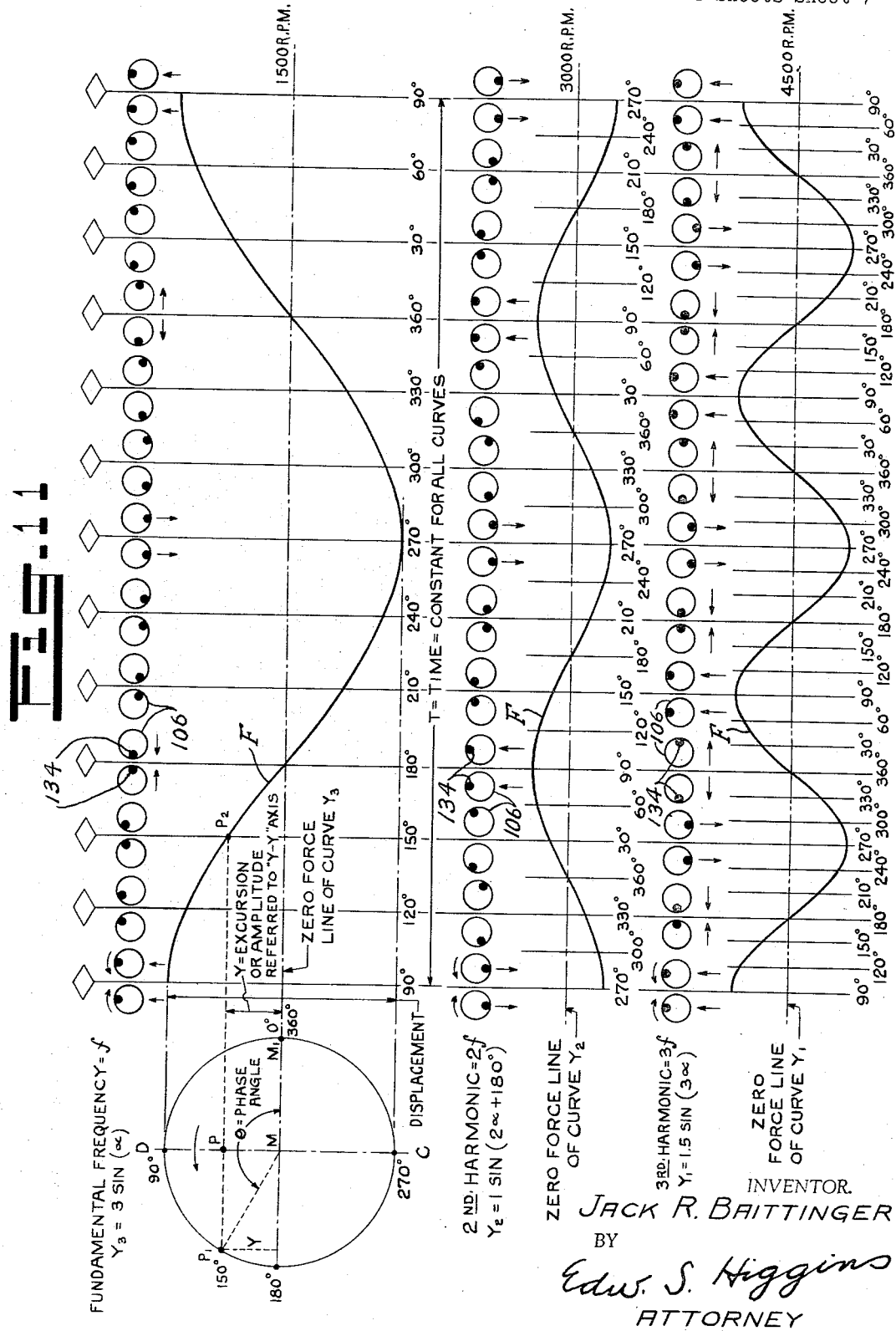

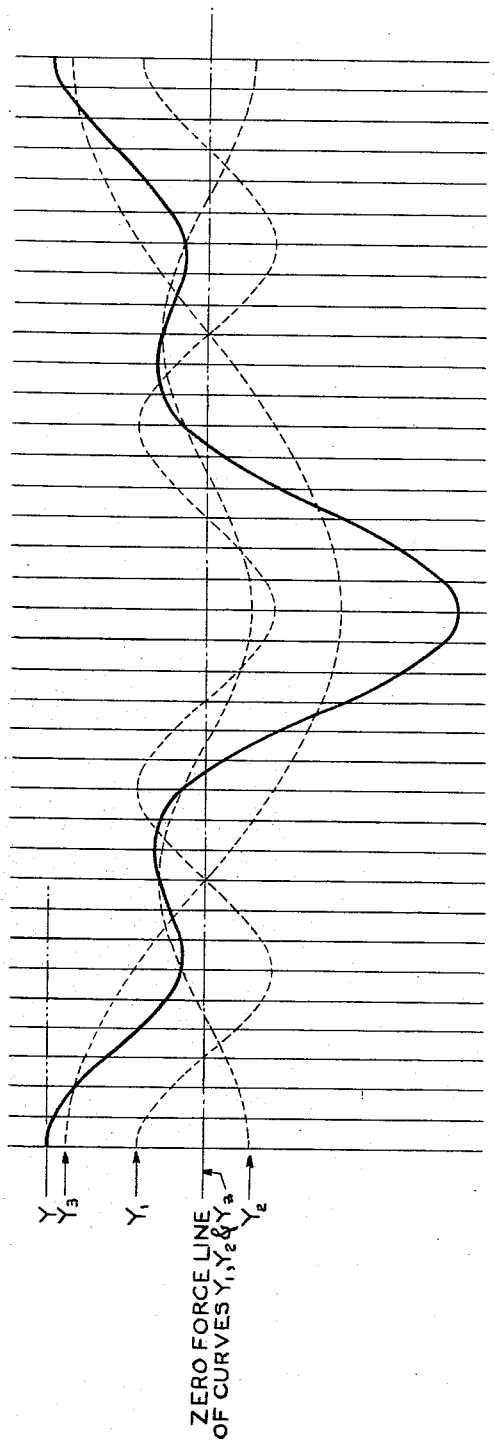

United States Patent Office 3,344,873
Patented Oct. 3, 1967

3,344,873
MECHANICAL HETERODYNE OSCILLATOR
Jack R. Baittinger, Scotch Plains, N.J., assignor of one-half to John J. Dougherty, Cedar Grove, N.J.
Filed Sept. 17, 1964, Ser. No. 397,210
11 Claims. (Cl. 175—55)

ABSTRACT OF THE DISCLOSURE

Apparatus for actuating piles, tubing and like elements comprising a housing coupled to the end of a pile, a source of alternating impulses in said housing balanced with respect to the axis of the pile and adapted to generate alternating impulses directed axially of the pile, a heavy metal block in the housing with pairs of opposed spaced recesses vertically and horizontally aligned, plate-like members rotatably mounted in the recesses, unbalanced ball weights carried by the plate-like members, opposed shafts in the block mounting the plate-like members, said opposed shafts rotatable about an axis extending perpendicular to the axis of the pile, the plate-like members spaced the same distance from the axis of the pile on opposite sides thereof, the center of gravity of each plate-like member being eccentric to the axis of rotation thereof, a turbine engine for rotating the plate-like members about the axes in opposite directions, the center of gravity of the pair of plate-like members being in phase with each other.

---

Broadly the invention concerns a system, method and apparatus for driving piles such as are used for building or other structural foundations and is applicable to pile driving either into dry surface earth, into marsh or tidewater ground, or in underwater situations. The piles preferably are those conveniently used, typically steel H-section members, members of corrugated section, tubular section or any other, and composed of steel, wood, prestressed concrete, plastic, etc.

Conventional pile drivers operate by hammering on the top of the pile, or by applying a forced vibration to the pile as a whole. This method because of the rigidity of the piles to buckling stresses is limited, the method can only be applied where the ratio of the height to the cross-section of the piles does not exceed a definite limit. Also the pile presents an inertia or mass reactance which tends to counteract the driving force. The driving force is needed at the bottom of the pile in order to force the pile through the earth. Any uncompensated inertia reactance from the pile itself is a waste of force subtracting from the applied energy before this energy can do its work at the bottom of the pile.

Furthermore, the usual pile driving process generates vibrations in the area surrounding the driving site owing to the high impacts involved. These vibrations may prove a hazard to adjacent structures, if any, so that in such cases the said method of pile driving cannot be used.

In heterogeneous soil, vertical driving is at times made very difficult because of the obstacles met with or because of the characteristics and nature of the terrain. Often there is a tendency for the pile to deviate and bend, developing strains which are liable to impair its strength or its subsequent firmness.

A principal object of the present invention is to provide an effective sonic wave method and an apparatus for driving piles wherein the inertia factor is eliminated as a deterrent to driving action.

In accordance with the invention, there is associated with the pile an apparatus adapted to impart to it alternating impulses which are oriented in predetermined constant directions and basically balanced. These impulses are oriented axially to the pile and are balanced in that they are imparted to the pile directly in the direction of the axis thereof.

The impulses oriented along the axis are made to act alternately toward the foot and toward the head of the pile. In one direction they combine additively with the weight of the pile while in the other they detract therefrom thus creating alternating variations in the thrust against the bottom of the driving hole.

In accordance with the invention, the application of oriented alternating impulses results in an increased rate of feed of the driven pile, and in a very quick and progressive rate of extraction, particularly valuable advantages in the case of large-sized pile elements or in heterogeneous or hard ground. The vibrating device and pile assembly, remain, at all times, in a balanced condition, and verticality is thereby promoted in the more usual case where the vertical piles are involved, moreover this suppresses harmful lateral stresses, responsible for inclined piles and ovalized tubing, all defects very difficult to correct.

The amplitude and frequency of the oriented impulses are predetermined as a function of the shape and mass of the pile. They are adjustable by varying the position, and contingently the inclination and/or other characteristics of the oscillatory elements used.

According to one practice of my invention, there is generated a comparatively large amplitude longitudinal sonic standing wave in the pile, using a sonic wave generator whose output impedance is well adjusted to that of the pile when considered as a sound wave transmission medium. The sonic wave generator is effectively coupled to the upper end of the pile, using a stiff, preferably substantially rigid coupling means between the two. In operation, the high impedance wave generator stiffly coupled to the high impedance pile, delivers a large amount of cyclic force to the pile and establishes a larger amplitude, or high energy, standing wave therein.

Other advantages of the present invention include great driving force, capability of driving long piles, reduction of wall skin friction, compact and easily handled driving machinery, and in addition a simple means by which the pile can be extracted if desired, extraction being an available reversible process obtained by merely exerting an upward tension on the sonically activated pile. The wave generator can be readily adjusted in frequency so as to generate a standard wave pattern which is desirably related to the dimensions of the pile, and can be readily adjusted to short or long piles. Attainment of the desired wave pattern is easily observed by the facility or rate of penetration of the pile itself. Pile driving and pulling operations may thus be very economically accomplished.

The present inventive system is based on the well known phenomenon that an elastic expansion or elongation in one direction in an elastic member causes a compensating elastic dilation in another direction. Thus, if longitudinal or torsional waves are generated in an elongated elastic pile, a corresponding vibratory change in cross section takes place. This causes the walls of the pile to vibrate laterally against the walls of the surrounding earth, and since this takes place at fairly high sonic vibration frequencies, at which the earth does not respond, the earth literally stands back, providing a small clearance between it and the surface of the pile.

A mechanical vibration as considered herein is a periodic motion of considerable magnitude which repeats itself in a definite time interval called the period of the vibration; each repetition of the motion being called a cycle, and the number of cycles per unit of time being called the frequency of vibration.

The present invention is concerned with forced vibrations. The amplitude of a "free vibration" of a body depends only on the starting conditions, whereas the amplitude of a "forced vibration" which is maintained by an alternating exciting force has a frequency and amplitude which are influenced by the frequency and amplitude of the exciting force. A small eccentricity in a rotating machine element under certain conditions can cause exciting forces that develop vibrations of very large amplitude.

For further comprehension of the invention and of the objects and advantages thereof reference will be had to the following description thereof and to the accompanying drawings.

In the drawings, forming a material part of this disclosure:

FIG. 1 is a schematic elevational view of a pile driver system in accordance with the present invention.

FIG. 2 is a top plan view thereof.

FIG. 3 is a front elevational view of the oscillator per se on an enlarged scale.

FIG. 5 is a vertical sectional view through the center of the oscillator.

FIG. 6 is a vertical sectional view taken on the line 6—6 of FIG. 5.

FIG. 7 is a horizontal sectional view taken on the line 7—7 of FIG. 3.

FIG. 8 is a vertical sectional view of the mechanism for presetting the relative positions of the eccentric balls.

FIG. 9 is a horizontal sectional view taken on the line 9—9 of FIG. 8.

FIG. 10 is a horizontal sectional view taken on the line 10—10 of FIG. 5 and looking in the direction of the arrows.

FIGS. 11 and 12 are views of charts of curves representing wave patterns.

Figure 4:
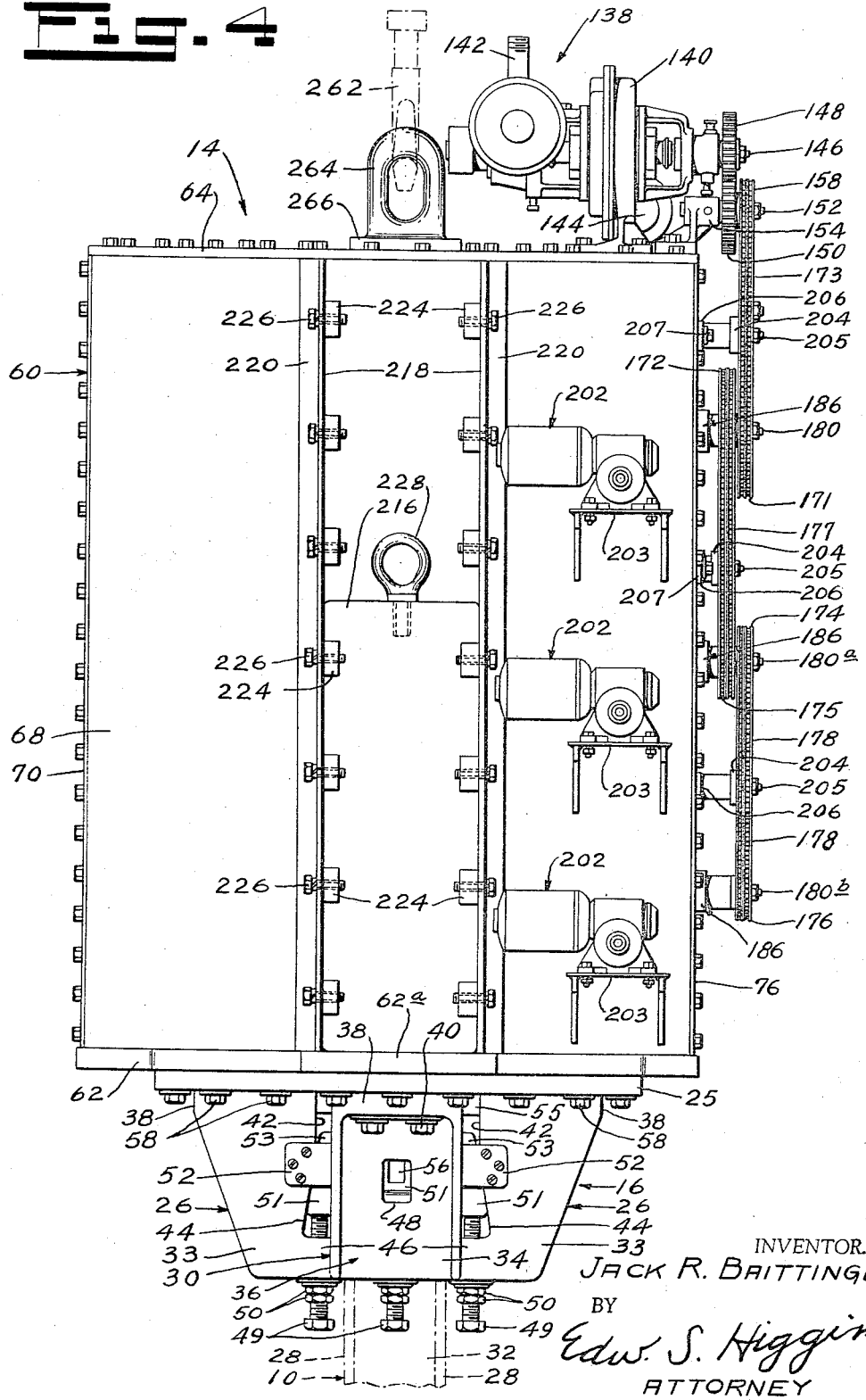
FIG. 4 is a side elevational view thereof on the same scale.

Broadly the invention shown and described herein is a machine of the heterodyne oscillator type. The method of using the oscillator is based on the excitation of structures, structural units or specimens to vibrations by means of artificially produced periodic impulses. The invention contemplates that the oscillator may be used as an instrument of testing materials. Such tests could be applied for example to bridge girders, trusses, ground and air borne vehicles, whole foundations and the like. Tests with this oscillator may be static or dynamic depending upon the application and the originality of the user.

Other uses for the oscillator are to dislodge the contents of a bin, railroad car or truck by shaking when the substance to be moved is by nature such that it would pack solid in place or bridge the provided discharge opening.

More particularly, the oscillator is used for the driving of piling as used in foundation work as well as the withdrawing of the pile. The consolidation of certain types of earth in either its natural foundation or as used in backfilling in the construction field can be achieved to any desired degree of practical density with the oscillator.

Another field for the use of the oscillator is in concrete construction equipment wherein the oscillator is a source of power for a vibrating "screed" for use on driveways, sidewalks, floors and patios. Its use would make it possible to pour and strike off a stiffer mix resulting in a stronger slab.

Referring now in detail to the various views of the drawings wherein similar reference numerals are used to indicate similar parts throughout, in FIG. 1 there is shown a typical application of the invention, wherein a conventional H-section steel pile 10 is shown being driven into the earth 12, by an oscillator made in accordance with the present invention and indicated generally at 14.

While I have illustrated an H-sectional steel pile, the invention is not limited either to the material of the pile or to any particular cross-sections or configurations. Thus, the invention is applicable to any pile made of elastic material capable of elastic standing wave action and may accordingly be constructed of any elastic metal, wood, plastic, or prestressed concrete. With regard to the cross-sectional configuration, the pile may have any conventional or desired cross-section, such as H-section, corrugated, tubular or solid. The present illustrative embodiment shows specific arrangements for coupling the oscillator to an H-section pile, but it will be readily understood by those skilled in the art how, by use of suitable adapters, or clamps, the oscillator may be properly coupled to the upper end of any form of pile.

The pile 10 is shown suspended, through a pile clamp chuck assembly 16, from the oscillator 14, which in turn is slidably mounted on a crane 18 privately carried by a transport vehicle 20 by means of a boom 22 and brace 24.

With particular reference to FIG. 10, the pile clamp chuck assembly 16 comprises a rectangular shaped mounting plate 25 and four clamping segmental units, including a pair of opposed units 26, 26, gripping the flanges 28, 28 of the H-pile 10, and a pair of opposed clamping units 30, 30 gripping the opposed sides of the web 32 of the pile. The construction of the clamping units are the same except that the clamping units 26, 26 are wider than the clamping units 30, 30 so that a description of one unit will suffice for all. For example, each clamping unit 26 and 30 comprises a solid cast metal substantially rectangular block 33 with one side 34 tapering downwardly and inwardly and formed with a cutout portion 36 providing a seat 38 at one end of the block, the top end as viewed in FIG. 6. The block is fastened rigidly to the plate 25 by bolts 40 passing through the seat 38. The inner side of the block is straight at its top as indicated at 42 and then slants or tapers outwardly as indicated at 44 terminating short of the bottom of the block, which bottom extends inwardly as indicated at 46. At the center of each block there is formed an opening 48, the purpose of which will be described hereinafter.

The inwardly extending ends 46 of the blocks are provided with boring screws 49 and locknuts 50. The clamping units 30 are provided with only one of said screws 49 as shown in FIG. 10. Slidable and retained against the tapered surfaces 44 of the blocks are the wedges 51, which are prevented from endwise displacement by the side plates 52 secured to the sides of the blocks as shown most clearly in FIG. 4. The wedges have an outward tapered surface 53 of the same degree of taper as the surfaces 44 of the blocks. Their inner surfaces 54 are vertical and at 90 degrees to their base surface upon which the ends of screws 49 exert their pressure. The wedges are provided with a narrow rectangular groove 56 centrally located between its side walls and in alignment with the opening 48 of the blocks 26 and 30. A wear plate 55 is removably seated and held in position between the straight side 42 of blocks 26 as shown in FIG. 5 and the recessed part 57 of the straight sides 42 in blocks 30 as shown in FIG. 6. This wear plate is provided to absorb the shocks and strains, and to protect the mounting plate 25 from undue wear and tear. The clamping clutch base plate 25 is secured to the bottom plate 62 of the oscillation by means of the screws 58.

In order to secure a pile, of the H-beam formation shown, to the oscillator 14 in a manner in which it will act as one part or a single unit, the screws 49 must be lowered. This is accomplished by releasing the lock nuts 52. With the lowering of the screws, the wedges 51 will drop down leaving a clearance for the flanges 28 and the web 32 of the pile 10 to pass without resistance, between the inner surfaces 54 of the wedges, when the oscillator is lowered upon the upper end of the pile. The weight of the oscillator will cause direct and solid contact between the pile and the wear plate 55. With the pile in place, the screws 49 are caused to move upwards, forcing the wedges 51 upward. This action, due to the tapered surfaces 44 of the clamping blocks and surfaces 53 of the wedges, forces the wedges inward against the flange and web surfaces of the pile. When no further upward motion of the wedges can be made by the screws 49, the pile is then securely held and the lock nuts 50 screwed up to prevent said screws from turning due to vibration, as shown in FIGS. 5 and 6.

When a pile is driven to its proper depth and is to be released from the oscillator clutch 16, the screws 49 are released and lowered. This action should allow the wedges 51 to drop down, thereby freeing their grip upon the pile and the oscillator 14 proper can be raised to clear the pile end. Should any of the wedges remain in their wedged position, a bar 99 or other suitable instrument as shown in FIG. 5 is inserted through the opening 48 in the block until the inserted end of the bar rests upon the base edge of the groove 56 in the wedge as shown. An upward pull or jerk of the bar 59 will release the wedge.

The oscillator or wave generator 14 will now be described. This oscillator comprises a rectangular-shaped hollow metal casing or housing 60 having a bottom wall constituted by a heavy steel plate 62, a top wall formed by a lighter steel plate 64, a rear wall formed by a thick heavy steel plate 66 as seen in FIGS. 6 and 7, a front wall formed by a lighter steel plate 68 and side walls formed by light steel plates 70 and 72. The walls are all shown bolted to each other, forming a unitary structure.

With particular reference to FIGS. 5, 6 and 7, at the center of the housing, extending from top wall 64 to bottom wall 62 there is a centrally located rectangular-shaped steel block 74 of very heavy weight. The block is formed with a series of six circular shallow recesses in the front surface thereof and six circular shallow recesses in the rear suface thereof, the recesses being in horizontal and vertical alignment. This series is constituted by a front recess 76 and an opposed rear recess 78, at the top, another front recess 80 and a companion rear recess 82 at the top as shown in FIG. 7; a front recess 88 and an opposed rear recess 90, at the bottom; another front recess 92 (FIG. 5) and a companion rear recess (not shown) at the bottom; a front recess 96 and an opposed rear recess 98 (FIG. 6); intermediate the top and bottom ends; and another front recess 100 (FIG. 5) and an opposed companion rear recess (not shown) intermediate the top and bottom ends. The recesses are formed on opposite sides of a center line indicated at 104 through the longitudinal center of the block as viewed in FIG. 6. A hole 105 is formed in the block through the centers of each pair of opposed front and rear recesses.

An annular hardened steel ball race 106 is seated in the periphery of each recess. A bushing 108 is interposed in each central hole 105.

In accordance with the present invention, a pair of oscillator units or rotor assemblies 110, 110 is installed in each pair of opposed front and rear recesses. Each oscillator unit or rotor assembly as best seen in FIGS. 5 and 6 comprises a heavy flat plate-like body 112 substantially rectangular in shape with one end formed with an enlarged head 114 serving as a counter balance. The body has its other end centrally cutaway forming a cutout 116. An elongated stub shaft or bearing hub 118 is formed laterally with the body and extends laterally from one side thereof at the juncture of the enlarged head and the body portion. On the opposite side of the body, there is a short stub shaft or bearing hub 120 aligned with the shaft or hub 118.

The oscillator units or rotor assemblies are held in place in the recesses by means of plates 122 and 122a bolted to the front and rear surfaces, respectively, of the block 74, the long stub shafts or bearing hubs 118 being journalled in bushings 126 in hollow cylindrical bearing members 128 welded to the plates 122 and 122a.

Referring now to FIGS. 5 and 7, each pair of oscillator units or rotor assemblies 110, 110 is arranged in a common vertical plane of the pile 10, and symmetrically placed with respect to it and rotated in opposing directions as indicated by the arrows. Each plate-like body 112 of each oscillator unit or rotor assembly loosely carries an unbalancing weight in the form of a ball 134 in the cutout portion 116. The unbalancing balls 134 are maintained at all times symmetrical and in phase with respect to each other. The motion of the rotor units or oscillator units in synchronized.

The oscillator unit plate-like bodies 112 owing to their in-phase unbalancing means 134 create forces which possess vertical components, alternating and variable in magnitude. The horizontal components are opposed to each other and cancel each other out at all times. The vertical components are transmitted to the center block 74, plate 25, clamping chuck 16 and pile 10 and impart thereto an alternating vertical force in the direction of the arrows F1–F2. When the impulse is exerted in the downward direction F1, it adds to the weight of the pile 10; when exerted in the upward direction F2, it detracts therefrom; thus the compressive thrust on the ground at the bottom end of the pile 10 is subjected to cyclic variations which provide repeated shocks which, added to the weight of the pile 10, and the pull of gravity, promote its sinking movement. The same action also facilitates extraction.

The mechanism for driving the oscillator units or rotor assemblies will now be described. Referring particularly to FIGS. 3 and 4, a conventional steam turbine engine 138 is bolted to the top plate 64 of the housing 60. The engine is shown as comprising a casing 140 with a steam inlet 142, a steam outlet 144 and a drive shaft 146 extending outwardly of the casing. A gear 148 is mounted adjacent the outer end of shaft 146. A pair of gears 150, 150a meshing with gear 148 are mounted on a pair of stub shafts 152 and 152a supported on the brackets 154 and 154a bolted to the top plate 64 adjacent the engine casing 140. Double chain sprockets 158 and 158a are mounted on the stub shafts 152 and 152a outwardly of the gears 150 and 150a.

Referring in particular to FIG. 7, a drive shaft 160 is shown mounted behind the two top rear oscillator units or rotor assemblies 110a. This shaft is journalled at its outer end by means of the bearing bracket 162, the base plate 163 of which is bolted to the rear plate 122a. The journal or bearing part of said bearing bracket 162 extends outward through an opening in the side wall plate 72. The inner portion of shaft 160 is journalled in a bearing bracket 164a centrally located between the rear oscillator units and having its base plate 165a bolted to the rear plate 122a. Secured on shaft 160 and located at the outer ends of the bearing sleeve of bracket 164a are the bevel gears 166 and 167; said gears being in mesh relation with bevel gears 168 and 169, respectively; said bevel gears being secured on the shafts 170 located within the bearing hub portions 118 and 120 of the oscillator 110a and are keyed therein to impel rotary motion to said oscillators. The bevel gears 166, 167, 168, 169 are backed up by thrust bearings. The end of the shaft 160 extending outwardly from the bearing bracket 162 has secured thereon the double chain sprockets 171a and 172a. The sprocket 171a is engaged by the chain 173a which also engages the sprocket 158a mounted by means of the bracket 154a on the top plate 64 which is most clearly shown in FIGS. 3, 4 and 5. The direction of rotation of sprockets 171a and 172a is in a counterclockwise direction as viewed and shown by the arrows in FIG. 3.

The foregoing description and relation of the various parts of the drive refer in particular to the two top rear oscillator units but it is to be understood that the two rear and bottom oscillator units are driven with the same identical parts, the only difference being in the double chain sprockets secured on the outwardly extending ends of shafts 160a and 160b.

Referring to FIGS. 3 and 5, the intermediate shaft 160a has secured on its outer end the sprockets 174a and 175a and the shaft 160b, the sprocket 176a. The sprocket 175a is engaged by the double chain 177a which also engage the sprocket 171a on shaft 160, and the chain 178a engages the sprocket 174a on the shaft 160a and also the sprocket 176a on shaft 160b. It will be noted that in FIG. 3, the sprockets on shafts 160, 160a and 160b vary in pitch diameter. The reason for this will be more fully described hereinafter.

The front series of oscillator units 110, top, FIG. 7 and the intermediate and bottom oscillator units, FIGS. 5 and 6, are retained in their relative operating positions and caused to rotate by means of the same relative parts as enumerated for those shown and described for the rear series of oscillator units 110a, with the exception of their main drive shafts which are divided into two shafts 180 and 182, FIGS. 7 and 8. Shaft 182 is journalled in the bearing sleeve of bracket 164 which is centrally located between the front oscillator units, its base plate 165 being bolted to the front plate 122, said plate being bolted to the front surface of the centrally located block 74. Said bearing bracket is exactly the same as that used in connection with the rear oscillator units. Shaft 182 has secured upon it the bevel gears 166a, and 167a, said gears being in mesh with gears 168 and 169, respectively. Upon the extended end of shaft 182 there is secured the bevel gear 183 in running mesh engagement with the intermediate bevel gear 184, which in turn is in mesh with the bevel gear 185 secured upon the inner end of the shaft 180, said shaft being journalled in the bearing sleeve of bracket 186, the base plate 187 of which is bolted to the front plate 122.

Referring in particular to FIG. 8, it will be seen that bevel gear 185 has an extended hub portion 188 upon which the worm wheel 189 rides in stationary position upon its bearing bushing 190. The worm wheel 189 has integral therewith the arm 191, in the extremity of which is secured a bearing pin 192 upon which the bevel gear 184 is freely mounted to rotate, and its thrusts are taken by means of the bearing 193. Bevel gear 185 by means of its extended hub 188 has its thrust resisted by bearing 194. The worm wheel 189, as stated, remains in a normal stationary position on the hub portion of the bevel gear 185, and it must be free to resist the friction between the shoulder 195 of the gear 185 and the thrust bearing 194, and it is for this reason that the thrust washers 196 are inserted between said shoulder 195 of the gear 185 and the thrust bearing 194.

Referring to FIG. 9, it will be seen that worm wheel 189 is engaged by the worm 197 secured on the shaft 198 journalled in the bearing blocks 199 secured in pitch alignment of said worm and worm wheel to the base plate 200 which is welded to and made part of the bearing bracket 186. The worm wheel 189 in operation will be caused to rotate in either a clockwise or counterclockwise direction as viewed in FIG. 9, the reason for which will be fully described hereinafter; and due to this reversal of rotation, the thrust bearings 201 (FIG. 9) have been provided to take up the thrust of the worm 197.

The worm shaft 198 is coupled to the low out-put shaft of the low speed reversible motor 202, by means of a coupling 202a (FIGS. 2, 3, 4 and 7); said motor being mounted upon the support bracket 203 which is welded in position to the outside surface of the front cover plate 68. Although the source of energy to said motor is not shown, any suitable means may be used so as to cause it to function in a forward or a reverse action.

Referring to FIGS. 2, 4, 7 and 8, the end of shaft 180 extending outwardly from the bearing bracket 186 has secured thereon the double chain sprockets 171 and 172. The sprocket 171 is engaged by the chain 173 which also engages the sprocket 158 mounted by means of the bracket 154 on the top plate 64, as clearly illustrated in FIGS. 3 and 4. The direction of rotation of sprockets 171 and 172 is in a counterclockwise direction as shown by the arrows in FIG. 3. The pitch diameter of the sprockets 171, 172, 171a and 172a are exactly the same.

The foregoing description and the relation of the various parts refer in particular to the drive for the two top front oscillator units 110, 110a (FIG. 7) but it is to be understood that the drive for the front intermediate and the two bottom oscillator units are constructed with similar parts, the only difference being in the double chain sprockets secured on the outwardly extending ends of shafts 180a and 180b.

Referring to FIGS. 3, 4 and 5, the intermediate shaft 180a has secured on its outer end the sprockets 174 and 175, and the shaft 180b, the sprocket 176. The sprocket 175 is engaged by the double chain 177 which also engages the sprocket 172 on the shaft 180, and the chain 178 engages the sprocket 174 on the shaft 180a and also the sprocket 176 on the shaft 180b. It will be noted in FIG. 3, that the sprockets on the shafts 180, 180a and 180b vary in pitch diameter, and as shown most clearly in FIG. 3, their pitch diameters are equal to the sprockets on the rear oscillator shafts 160, 160a and 160b, respectively. The reason for this will be more fully described hereinafter.

Each of the three chains 160, 160a, 160b, 180, 180a and 180b requires slack take-up. This is obtained by means of the adjustable idler sprockets 204 rotatably held on their idler pins 205 which are secured in the adjustment plate 206, said adjustment plates being in adjustable position by means of the screws 207 (FIG. 3) which are in threaded connection with the side wall 72.

The oscillator 14 as a unit will be guided vertically as it descends by means of the reinforced guides 210, secured to the rear wall 66, slidably engaging the front guide rails 212 of crane 18 as shown in FIG. 1 and in FIG. 2 in dot and dash lines. The guides 210 are of such length to insure true vertical sliding action and are secured to the rear wall 66 by a series of bolts 214.

A rectangular weighted member 216 is removably supported at the front of the housing 60 on a centrally located extension 62a of the bottom plate 62 of the housing. The weighted member is disposed between the spaced wall members 218, 218 having flanges 220 welded to the front wall 68 of the housing. The wall members extend from top to bottom of the housing and are formed with aligned closed transverse slots 222. Blocks 224 held by bolts 226 are movably and adjustably mounted in the slots. The blocks are adapted to impinge against the front of the weighted member 216 to hold it in place. A removable screw threaded bolt 228 is provided on the top of the weighted member for manipulating the same. A longer weighted member may be used or several weighted members may be used in order to balance the apparatus and add weight to the oscillator 14 when another length of pile is attached to the original driven pile.

An extension 62b similar to extension 62a of the bottom plate extends rearwardly of the rear wall 66 of the housing 60 at the center thereof, with spaced wall members 230, 230 extending upwardly therefrom to the top of the housing and provided with flanges 232 welded to the rear wall. The extension 62b is adapted to support a weight or weights (not shown) between wall members 230, which wall members are provided with transverse slots 234 to receive slidably the bolts 236 and the blocks 238 for holding a supported weight in place.

At the bottom of the housing 60, at each side thereof and at the top of the housing at each side thereof adjacent the side walls 70 and 72 (FIGS. 5, 6 and 7), there are reinforcing and tying-in arms 240 and 242, respectively. These arms are substantially rectangular in shape with one end enlarged as indicated at 244 on bottom arm 240 and at 246 on top arm 242. Each arm 240 and 242 extends from close to the front wall 68 to the rear wall 66 of the housing with their rear ends welded to the rear wall, the bottom arms 240 being welded to the bottom wall 62. The forward reduced ends 248 and 250 of the arms 240 and 242 extend through rectangular shaped notches or recesses 252 and 254 formed in the center block 74 (FIG. 5) at the top and bottom sides thereof adjacent the juncture of the bottom and top of the side walls and the side walls 60 and 72. The upper edges of the reduced ends 248, 250 of the arms where they pass through the notches or recesses engage the shoulders formed by the recesses 252 and 254 in the block 74 so that the arms 240 and 242 assist in supporting the center block. At the juncture of the arms and the enlarged portions 244 and 246 thereof shoulders 256 and 258 (FIG. 6) are formed which act as guides in properly positioning the center block 74 in assembling.

The block 74 and its assembly of the oscillator front and rear units, plus their operating parts are placed in position upon the base plate 62 by sliding them into position as shown in FIG. 6, until the rear surface of block 74 abuts the shoulders 256 and 258 of the arms 240 and 242. This position will center the block 74 on the center line 104 of the pile, FIGS. 6 and 7. The shoulders 256 and 258 are provided for this purpose. The arms are then securely fastened to the block 74 by means of the countersunk screws 260 as shown in FIG. 5. When the block and its operating parts are assembled in place, the front cover plate 60 and side plates 72 are then secured in position as shown. The arms also provide rigidity between the rear wall 66 and the base plate 62.

In mounting the oscillator 14 on the crane 18, a cable (not shown) is connected to the oscillator by means of a hook 262 as shown in dotted lines in FIG. 4, which is removably fastened to an eye or loop 264. The eye has a base plate 266 and a cylindrical extension 267, which is press fitted into the center block 74. The base plate of the eye 266 is welded to the central block 74 and is positioned in an opening 278 in the top wall 64 of the housing. The cylindrical extension 267 extends into a recess formed in said block 74 and is fastened to the block by means of a pin 280 extending transversely through the block 74.

An important feature of the present invention is mechanism for initially adjusting or presetting the positions of the eccentric balls 134 of the front oscillator units or rotor assemblies relative to the positions of the balls 134 of the rear units for the purpose of producing any desired frequency and amplitude. This mechanism includes part of the mechanism for driving the front oscillator units or rotor assemblies, to wit, the driven shafts 180 and 182, bevel gears 183, 184 and 185 (FIGS. 7, 8, 9). When the worm wheel 189 is rotated by the motor 202, the arm 191 is bodily carried around with the worm wheel, rolling the bevel gear 184 over the teeth of bevel gear 185. This rolling action turns bevel gear 183 and shaft 182, said turning action being transmitted to the oscilllator unit shafts 170 by means of the bevel gears 166a, 168 and 167a, 169, and due to this turning action the front oscillator unit arms 112 with the balls 134 can be turned to any degree clockwise or counterclockwise whille the rear oscillator units remain stationary. When they are thus adjusted a predetermined degree, the oscillator is ready for operation of driving the pile 10. This adjustment of the front oscillator unit balls 134 in relation to the rear oscillator balls can be made when the oscillator unit 14 as a whole is in operation. Due to the remote control of the reversible motors, they can be caused to operate in a clockwise or counterclockwise direction, either singly or collectively in either direction to suit pile driving conditions. These conditions will vary due to the size and weight of the pile being driven and the number of connected pile sections required for a single pile driving operation. The relative positions of the balls on the front oscillator units relative to the balls on the rear oscillator units control the impedance and frequency as represented by the curve line F on the diagrams of FIG. 11.

In FIG. 12, there is shown diagrammatically the superposition of three vibrations of unequal amplitude and frequency, depicted by curves $y$, $y'$, $y^2$, $y^3$. It is well known that a body having harmonic motion continually traces the same path over and over. This fact makes it difficult to clearly indicate the mass is moving at a particular instant. In order to clarify this, the path of the vibration may be displayed by expanding it laterally as shown in the diagram of FIG. 12 for the sinusoidal plots. The curves shown combine the harmonic motion up and down with uniform linear motion sideways, in this case time, the two motions being at right angles. Because of their relation to a circle, the trigonometric and inverse trigonometric functions are called circular functions. The sinusoidal curves are harmonic and periodic. The curve resulting from the combination of these sinusoidal curves is periodic but not harmonic. The curves shown which are intended as being representative but not excluding similar combinations for the purpose of application are constructed as follows:

$$Y = Y^1 + Y^2 + Y^3 = [1.5 \sin (3\alpha)] + [1 \sin (2\alpha + 180°)] + [3 \sin (\alpha)]$$

It will be seen that the rotating rotor assemblies 110, 110a exert, through their shafts, a high alternating force output, appropriate to the driving of the high impedance load, such as is represented by the pile, associated mass, and the earth; and this force output is applied to the block 74, oscillator housing 60 and thence to the upper end of the pile.

The oscillator housing, together with the turbine and associated driving means and the pile itself represent a large mass or inertia which must be cyclically driven by the alternating force output of the oscillator. The pile is thus readily set into powerful high amplitude standing wave vibration, easily approaching the elastic limit of the pile.

In operation, the turbine rotor shaft 146 is rotated in the usual manner. This rotating turbine shaft rotates, through the described shafting and gearing, the unbalanced rotor assemblies 110, 110a. As previously described, this creates synchronized alternating vertically oriented forces applied to the rotor assembly shafts, which are resisted by the high impedance system made up of the oscillator housing, turbine and associated parts, coupling 16 and the resonant pile in its environment. These parts accordingly move through short displacement distances, at relatively low velocity but with very great force, to drive the pile effectively.

The longitudinal alternating force so applied to the upper end of the pile sends alternating high amplitude elastic waves of compression and tension traveling along the length of the pile and a resonant longitudinal standing wave is set up therein with consequent build up of vibration amplitude.

While I have illustrated and described the preferred embodiment of my invention, it is to be understood that changes in details of construction might be made without departing from the principle of the invention and I desire therefore to be limited only by the state of the prior art and the appended claims.

I claim:

1. Apparatus for actuating piles comprising a housing coupled to the end of a pile, a source of alternating impulses in said housing, said source being balanced with respect to the axis of the pile and adapted to generate alternating linear impulses directed axially of the pile, a heavy metal block in said housing extending from the top to the bottom thereof, said block having pairs of spaced circular recesses in opposite sides thereof, said recesses being vertically and horizontally aligned, plate-like members rotatably mounted in said recesses, said plate-like members carrying unbalanced ball weights, closure plates securing said plate-like members in said recesses, the mounting of said plate-like members including opposed shafts journalled in the block and in the closure plates, and rotatable about axes extending perpendicular to the axis of the pile, with the members spaced at substantially the same distance from the axis of the pile on opposite sides thereof, the center of gravity of each plate-like member being eccentric to the axis of rotation thereof, and means for rotating the plate-like members about their axes in unison in opposite directions, with the center of gravity of the pair of plate like members in phase with each other.

2. Apparatus for actuating piles or the like comprising for use in conjunction with a pile, a housing adapted to be unitarily secured to the pile, a block in said housing secured thereto, pairs of spaced rotatable plate-like members supported on said block, a turbine engine on the housing operatively connected to said members rotating the same, parallel eccentric weighted balls slidably mounted on said plate-like members symmetrically disposed with respect to the pile axis and arranged to remain continuously in phase so as to pass together through their uppermost position and together through their lowermost position, rotation of said plate-like members imparting to said pile balanced impulses vertically, and means for initially adjusting the positions of the balls relative to each other.

3. Apparatus for actuating piles comprising a housing coupled to the end of a pile, a rectangular shaped metal block in said housing, said block having three pairs of circular shallow recesses on each side thereof, with a hole connecting each pair of recesses aligned on opposed sides, said recesses being vertically and horizontally aligned, a source of alternating impulses in each recess, each source being balanced with respect to the axis of the pile and adapted to generate alternating linear impulses directed axially of the pile, each source including a substantially plate-like member having central shafts protruding from opposite sides thereof, said shafts disposed on an axis perpendicular to the axis of the pile, closure plates holding the plate-like members in the recesses, said shafts journaled in the holes connecting the recesses and in the closure plates, each of said plate-like members having an enlarged head at one end and a cutout at the other end thereof with an unbalanced ball weight slidable in each cutout, and means for rotating said shafts journaled in the closure plate in opposite directions.

4. Apparatus for actuating piles as defined in claim 3, wherein the rotating means includes a turbine engine on the housing, a drive shaft protruding from said engine and shafting and gearing operatively connected to said drive shaft and to the shafts journaled in the closure plates.

5. Apparatus for actuating piles as defined in claim 4 and means for initially adjusting the position of the ball weights relative to each other.

6. Apparatus for actuating piles comprising a housing coupled to the end of an H-pile, a rectangular shaped metal weighted block in said housing, said block having three pairs of circular shallow recesses in the front side and in the rear side thereof, with a hole connecting a recess at the front with a recess at the rear, said recesses being vertically and horizontally aligned, a source of alternating impulses in each recess, each source being balanced with respect to the axis of the pile and adapted to generate alternating linear impulses directed axially of the pile, each source including a substantial plate-like member having central shafts protruding from opposite sides thereof, said shafts being disposed on an axis perpendicular to the axis of the pile, closure plates holding the plate-like members in the recesses, said shafts journaled in the holes connecting the recesses and in the closure plates, each plate-like member having an enlarged head at one end and a cutout at the other end and an unbalanced ball weight slidable in each cutout, means for rotating the shafts journaled in the closure plates, including a turbine engine on the housing, a drive shaft protruding from said engine and shafting and gearing operatively connected to said drive shaft and to the shafts journaled in the closure plates holding the front plate-like members and to the shafts journaled in the closure plates holding the rear plate-like members, the shafts connected to the front plate-like members being divided into two parts, the adjacent ends of said parts being spaced from each other, bevel gears on the adjacent spaced ends of the parts, a sleeve around one shaft part, a bevel gear mounted on the end of said sleeve, an arm integral with said latter end bevel gear, a bevel gear rotatably carried by said arm meshing with the bevel gears on the adjacent ends of the parts, means for rotating the sleeved bevel gears whereby the arm bevel gear rolls around the bevel gears on the ends of the shaft parts and whereby the shafts mounting the plate-like members at the front of the block are adapted to rotate independently of and relative to the shafts mounting the plate-like members at the rear of the block in order to adjust the relative positions of the ball weights carried by the plate-like members.

7. Apparatus for actuating piles as defined in claim 6 wherein the coupling between the housing and pile includes a mounting plate connected to the bottom end of the housing, a pair of opposed segmental clamping units gripping the flanges of the body of the H-pile, another pair of opposed segmental clamping units gripping the web of the H-pile, each unit including a solid cast metal rectangular tapered block fastened to the mounting plate, the inner face of the block tapering downwardly and outwardly, a wear plate interposed between the mounting plate and the tapered blocks, wedges slidable against the tapered faces of the opposed blocks, and screws pressing the wedges against the tapered faces of the clamping blocks.

8. Apparatus for actuating piles comprising a housing coupled to the end of a pile, a source of alternating impulses in said housing, said source being balanced with respect to the axis of the pile and adapted to generate alternating linear impulses directed axially of the pile, a heavy metal block in said housing extending from the top to the bottom thereof, said block having pairs of spaced circular recesses in opposite sides thereof, said recesses being vertically and horizontally aligned, plate-like members rotatably mounted in said recesses, said plate-like members carrying unbalanced ball weights, closure plates securing said plate-like members in said recesses, the mounting of said plate-like members including opposed shafts journalled in the block and in the closure plates, and rotatable about axes extending perpendicular to the axis of the pile, with the members spaced at substantially the same distance from the axis of the pile on opposite sides thereof, the center of gravity of each plate-like member being eccentric to the axis of rotation thereof, and means for rotating the plate-like members about their axes in unison in opposite directions, with the center of gravity of the pair of plate-like members in phase with each other, said latter means including a turbine engine on the housing, a drive shaft protruding from said engine, and shafting and gearing operatively connected to said drive shaft and to the shafts journaled in the closure plates.

9. Apparatus for actuating piles as defined in claim 8 wherein the plate-like members each includes a substantially rectangular shaped body with an enlarged head at one end and a cutout portion at the other end thereof, said ball weights being slidably mounted in said cutout portions.

10. Apparatus for actuating piles comprising a housing coupled to the end of a pile, a source of alternating impulses in said housing, said source being balanced with respect to the axis of the pile and adapted to generate alternating linear impulses directed axially of the pile, a heavy metal block in said housing extending from the top to the bottom thereof, said block having pairs of spaced circular recesses in opposite sides thereof, said recesses being vertically and horizontally aligned, plate-like members rotatably mounted in said recesses, said plate-like members carrying unbalanced ball weights, closure plates securing said plate-like members in said recesses, the mounting of said plate-like members including opposed shafts journalled in the block and in the closure plates, and rotatable about axes extending perpendicular to the axis of the pile, with the members spaced at substantially the same distance from the axis of the pile on opposite sides thereof, the center of gravity of each plate-like member being eccentric to the axis of rotation thereof, and means for rotating the plate-like members about their axes in unison in opposite directions, with the center of gravity of the pair of plate like members in phase with each other, the plate-like members each including a substantially rectangular shaped body with an enlarged head at one end and a cutout portion at the other end thereof, said ball weights being slidably mounted in said cutout portions.

11. Apparatus for actuating piles which comprises the combination with a pile of a housing adapted to be rigidly coupled to the top of the pile, a block in said housing fixedly secured to the bottom of the housing, top, bottom and intermediate pairs of shafts journalled in said block, said shafts disposed on axes perpendicular to the axis of the pile, elongated rectangular shaped front and rear plate-like members fixed on said shafts and rotatable therewith, each plate-like member having an enlarged head at one end and a cutout portion at the other end, an unbalanced weighted ball slidable in each cutout portion, said members spaced at substantially the same distance from the axis of the pile on opposite sides thereof, the center of gravity of each plate-like member being eccentric to the axis of rotation thereof, and means for rotating the plate-like members about their axes in unison in opposite directions, with the center of gravity of the pair of plate-like members in phase with each other, said latter means including a turbine engine on the housing, a drive shaft protruding from said engine and shafting and gearing operatively connected to said drive shaft and to the shafts mounting the plate-like members, and means for initially adjusting the position of the weighted balls relative to each other.

References Cited
UNITED STATES PATENTS

| | | | |
|---|---|---|---|
| 2,953,282 | 9/1960 | Peterson | 74—61 X |
| 2,970,487 | 2/1961 | Ongaro | 74—61 |
| 2,974,536 | 3/1961 | Yorgiadis | 74—61 |
| 2,975,846 | 3/1961 | Bodine | 175—19 |
| 3,054,463 | 9/1962 | Bodine | 175—19 |
| 3,056,306 | 10/1962 | Muller | 14—61 |
| 3,106,258 | 10/1963 | Muller | 175—19 X |
| 3,208,292 | 9/1965 | Austin et al. | 74—61 |
| 3,262,329 | 7/1966 | Herrmann | 74—61 |

CHARLES E. O'CONNELL, *Primary Examiner.*

R. E. FAVREAU, *Assistant Examiner.*